Aug. 26, 1952 E. H. KIDDER 2,608,225
ROTARY CUTTER WITH HELICALLY CONCENTRIC CUTTING EDGES
Filed Dec. 30, 1947

Ephraim H. Kidder
INVENTOR.

BY
*Attorneys*

Patented Aug. 26, 1952

2,608,225

UNITED STATES PATENT OFFICE 2,608,225

ROTARY CUTTER WITH HELICALLY CONCENTRIC CUTTING EDGES

Ephraim H. Kidder, Cadillac, Mich.

Application December 30, 1947, Serial No. 794,656

1 Claim. (Cl. 144—230)

This invention relates to new and useful improvements and structural refinements in dado heads, and the principal object of the invention is to provide a device of the character herein described, such as may be conveniently and effectively employed in the formation of channels or grooves in wood, or the like.

A further object of the invention is to provide a dado head including a plurality of adjustable cutters which may be set to suit the particular conditions or requirements of the work.

Another object of the invention is to provide a dado head which is simple in construction, which will not easily become damaged, and which will readily lend itself to economical manufacture.

With the above more important objects in view, and such other objects as may become apparent as this specification proceeds, the invention consists essentially of the arrangement and construction of parts as illustrated in the accompanying drawings, in which.

Like characters of reference are employed to designate like parts in the specification and throughout the several views.

Figure 1:
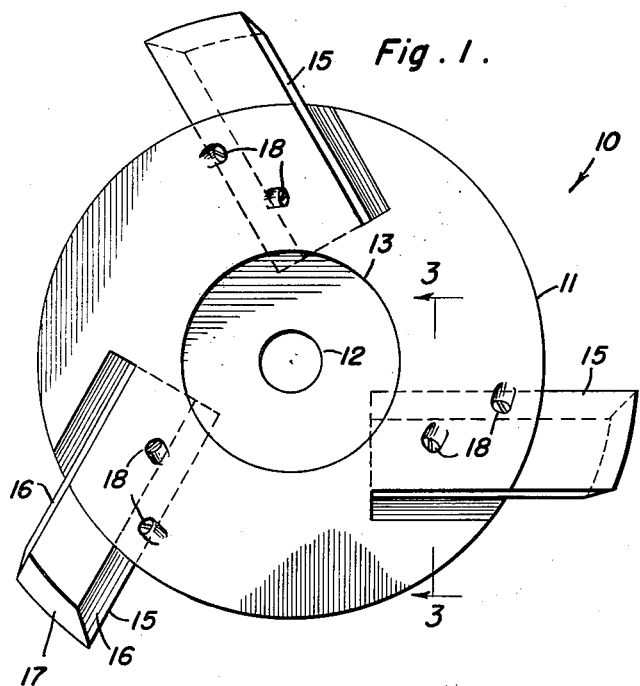
Figure 1 is an elevational view of the invention.
Figure 2:
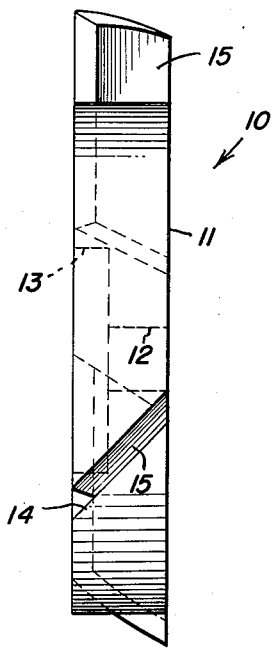
Figure 2 is an edge view thereof.
Figure 3:
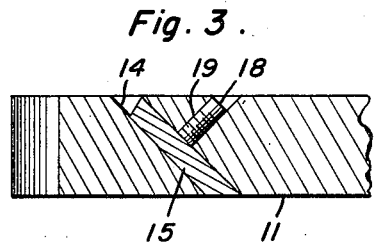
Figure 3 is a cross sectional view, taken substantially in the plane of the line 3—3 in Figure 1.
Figure 5:
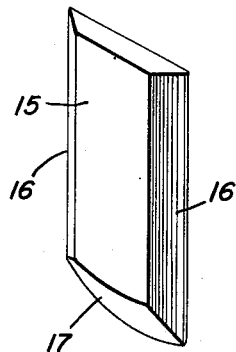
Figure 5 is a perspective detail of one of the cutters used therein.
Figure 4:
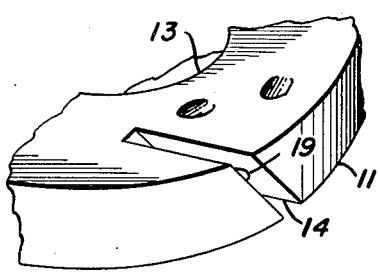
Figure 4 is a fragmentary perspective detail of the head body used in the invention.

Referring now to the accompanying drawings in detail, the invention consists of a dado head designated generally by the reference character 10, the same embodying in its construction what may be referred to as a disc-like body 11 formed at the center thereof with a suitable opening 12, counterbored as at 13, so as to accommodate a mandrel or shaft (not shown) on which the dado head is to be mounted when in use.

The peripheral portion of the body 11 is provided with a plurality of equally spaced, radially extending and transversely oblique slots 14, wherein a plurality of cutter blades 15 are adjustably and removably mounted.

Each of these blades is of a substantially rectangular configuration and is provided with bevelled side edges 16 while its outer portion is also bevelled and terminates in an arcuate cutting edge 17.

The cutters are adjustably and removably held in position by means of suitable set screws 18 which engage screw threaded apertures 19 formed in the body 11, the apertures 19 being obliquely disposed, so to speak, whereby the longitudinal axes of the screws 18 extend substantially at right angles to the faces of the cutters 15.

When the invention is placed in use, the depth of cut made by the head may be readily adjusted by simply loosening the screws 18 and varying the extent of insertion of the cutters 15 in the slots 14. Moreover, the cutters may be easily and conveniently removed for replacement by cutters of different widths, in accordance with the particular requirements of the work.

In any event, it is to be noted that the curvature of the cutting edges 17 is preferably such that these edges are helically concentric with the axis of rotation of the body 11, which arrangement is due to the oblique disposition of the cutter blades and affords a smooth, efficient and gradual shaving action in the performance of the cutting operation.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

The combination of a rotatable dado head provided in its peripheral portion with a blade receiving slot open at both ends thereof and having straight parallel side edges, and a flat-sided cutter blade mounted in and projecting outwardly from said slot, said slot and said blade being oblique to the axis of rotation of said head and said blade having a bevelled outer portion terminating in an arcuate cutting edge, said edge being helically concentric with the stated axis, said head being provided at one side thereof with screw-threaded bores communicating with the respective slots and having their axes perpendicular to the flat sides of the respective blades, and blade engaging set screws provided in said bores.

EPHRAIM H. KIDDER.

REFERENCES CITED

The following references are of record in the file of this patent:

UNITED STATES PATENTS

| Number | Name | Date |
|---|---|---|
| 399,107 | Winter | Mar. 5, 1889 |
| 895,219 | Whittemore et al. | Aug. 4, 1908 |
| 953,359 | Tainter et al. | Mar. 29, 1910 |
| 1,046,737 | Conklin | Dec. 10, 1912 |
| 1,308,313 | Whitney | July 1, 1919 |
| 1,423,192 | Converse | July 18, 1922 |
| 1,908,628 | Redinger | May 9, 1933 |

FOREIGN PATENTS

| Number | Country | Date |
|---|---|---|
| 439,926 | Great Britain | Dec. 17, 1935 |